United States Patent
Ebert et al.

(10) Patent No.: US 9,986,744 B2
(45) Date of Patent: Jun. 5, 2018

(54) CLIPPING MACHINE WITH EASY ACCESS

(71) Applicant: Poly-clip System GmbH & Co. KG, Hattersheim (DE)

(72) Inventors: Detlef Ebert, Bad Nauheim (DE); Wolfgang Nikoley, Mainz-Kastel (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 42 days.

(21) Appl. No.: 15/387,260

(22) Filed: Dec. 21, 2016

(65) Prior Publication Data

US 2017/0172164 A1    Jun. 22, 2017

(30) Foreign Application Priority Data

Dec. 22, 2015   (EP) .................................... 15202182

(51) Int. Cl.
  *A22C 11/00*    (2006.01)
  *A22C 11/12*    (2006.01)
  (Continued)

(52) U.S. Cl.
  CPC ............ *A22C 11/125* (2013.01); *A22C 11/00* (2013.01); *A22C 11/008* (2013.01); *A22C 11/02* (2013.01);
  (Continued)

(58) Field of Classification Search
  CPC ... A22C 11/00; A22C 11/0001; A22C 11/006; A22C 11/02; A22C 11/10
  (Continued)

(56) References Cited

U.S. PATENT DOCUMENTS 6,071,186 A * 6/2000 Shibata .................. A22C 11/00
                                                            452/182
6,786,813 B2 * 9/2004 Shefet .................. A22C 11/127
                                                            452/51
(Continued)

FOREIGN PATENT DOCUMENTS

EP          1428437 A1     6/2004

OTHER PUBLICATIONS

Poly-clip System GmbH & Co. KG, ICA 8700 Doppel-Clip-Automat, Mar. 1, 2015 (4 pages).
(Continued)

*Primary Examiner* — Richard T Price, Jr.
(74) *Attorney, Agent, or Firm* — Fitch, Even, Tabin & FlanneryLLP

(57) ABSTRACT

The present invention relates to a clipping machine for producing sausage-shaped products, like sausages, by filling a tubular or bag-shaped packaging casing with filling material and closing said filled tubular or bag-shaped packaging casing. The clipping machine includes a filling tube through which the filling material is fed into said tubular or bag-shaped packaging casing which is stored on said filling tube, a casing brake assembly arranged on the filling tube for limiting the movement of the tubular packaging casing at least while being filled, gathering means for gathering said filled tubular packaging casing and for forming a plait-like portion thereto, and a clipping device for applying at least one closure means, like a closure clip, to the plait-like portion formed on the filled tubular or bag-shaped packaging casing in a closing region. The clipping machine further comprises a housing defining at least a front wall, a rear wall, and two side walls of the clipping machine, for enclosing at least the clipping device and the gathering means. The housing includes at least one housing element arranged in the front wall of the housing for covering at least
(Continued)

the closing region, wherein the at least one housing element is coupled to the clipping machine by a linking device including a shifting mechanism for reversibly shifting the housing element relative to the clipping machine, in a shifting direction, for granting access to the closing region of the clipping machine.

16 Claims, 7 Drawing Sheets

(51) Int. Cl.
*A22C 11/02* (2006.01)
*A22C 11/10* (2006.01)
(52) U.S. Cl.
CPC ...... *A22C 11/0245* (2013.01); *A22C 11/0263* (2013.01); *A22C 11/10* (2013.01); *A22C 11/12* (2013.01)
(58) Field of Classification Search
USPC ........................ 452/30–32, 35–37, 46–48, 51
See application file for complete search history.

(56) References Cited

U.S. PATENT DOCUMENTS

| | | | |
|---|---|---|---|
| 6,932,688 B2* | 8/2005 | Stanley | A22C 11/02 452/46 |
| 7,488,243 B2* | 2/2009 | Wince | A22C 11/005 452/30 |
| 8,366,523 B2* | 2/2013 | Topfer | A22C 11/125 452/31 |
| 8,545,293 B2* | 10/2013 | Lendenmann | A22C 15/001 452/51 |
| 8,979,619 B2* | 3/2015 | Lang | A22C 11/00 452/32 |

OTHER PUBLICATIONS

Langley, K., Machine Safeguarding at the Point of Operation a Guide for Finding Solutions to Machine Hazards, Apr. 16, 2015 (68 pages).
Extended European search report issued in corresponding European Application No. 15202182.0 dated Jun. 22, 2016 (9 pages).

* cited by examiner

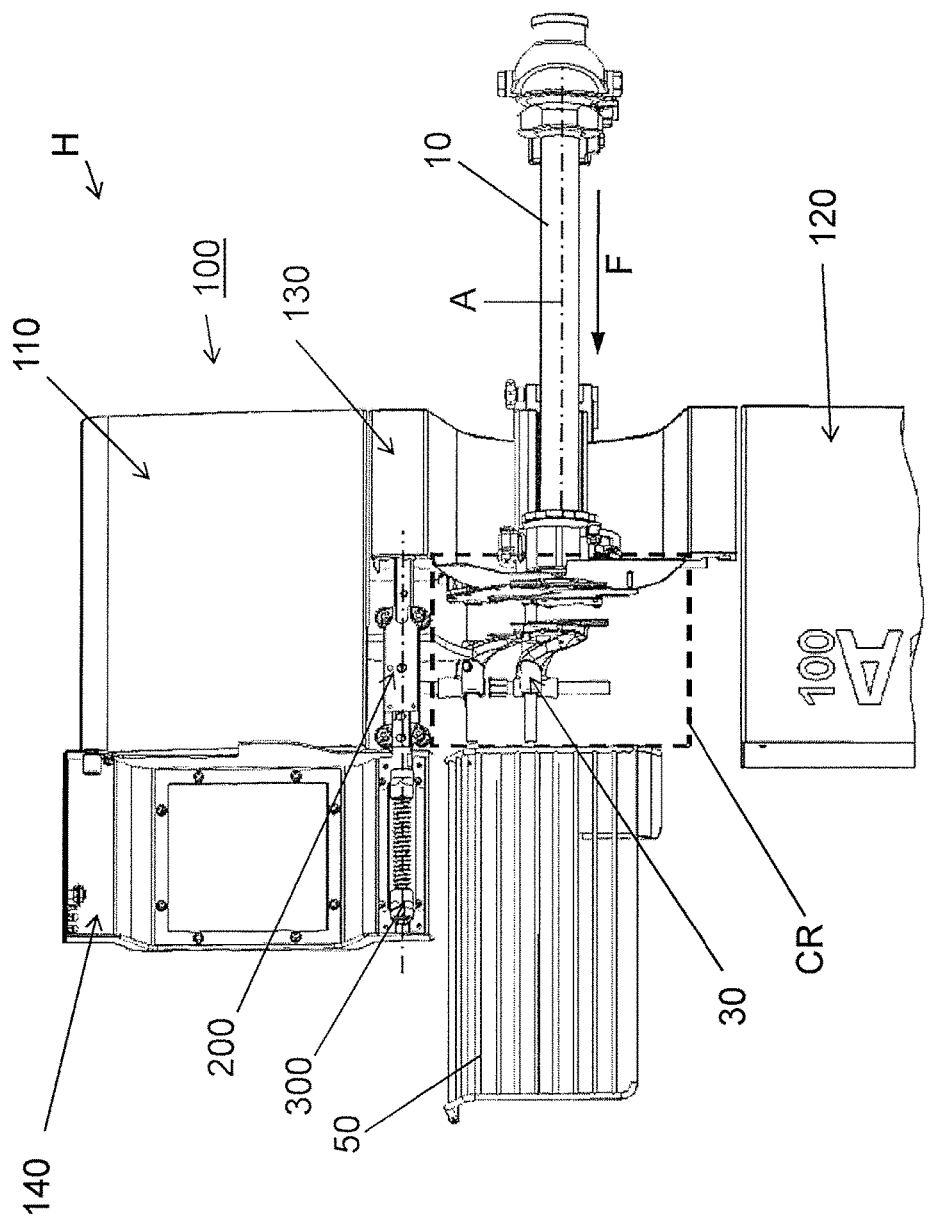

CLIPPING MACHINE WITH EASY ACCESS

CROSS-REFERENCE TO RELATED APPLICATION

The present application claims the benefit of priority of European Patent Application No. 15202182.0 filed Dec. 22, 2015, the contents of which are incorporated herein by reference in their entirety.

FIELD

The present invention relates to a clipping machine for producing sausage-shaped products which includes an improved covering door.

BACKGROUND OF THE INVENTION

In practice, it is known that, for example in the production of sausage-shaped products, like sausages, filling material is fed by a filling machine through a filling tube of a clipping machine into a tubular packaging casing which is stored on the filling tube and which is closed at its front end, i.e. the end pointing in the feeding direction of the filling material by a closure means, like a closure clip. The tubular packaging casing is pulled-off from the filling tube while being filled by the feeding pressure. A casing brake applies a frictional force to the tubular packaging casing while being pulled-off from the filling tube, in order to control the pull-off motion of the tubular packaging casing. After a predetermined amount of filling material has been filled into said tubular packaging casing, gathering means with a first and a second displacer unit which can each be formed by a pair of reversibly moveable displacement elements, forms a plait-like portion of the tubular packaging casing, which is at least approximately free from filling material. The clipping machine then places and closes at least one closure clip at the plait-like portion forming the rear end of the sausage shaped product, i.e. the end pointing against the feeding direction by a clipping device having respective closing tools which are reversibly movable towards the plait-like portion.

In order to prevent an operator from reaching in the movable parts of the clipping machine during the production process, like the gathering means, the clipping device and/or parts of the drive means for driving the clipping machine, known clipping machines are provided with a coverage or housing. For enabling a refill of tubular packaging casing on the filling tube or for facilitating cleaning of the clipping machine after a production cycle, portions of the coverage or housing of said known clipping machines may be pivoted from the clipping machine to reach in interior regions of the clipping machine.

For refilling tubular packaging casing, e.g. prepackaged casing material, on the filling tube, said tubular packaging casing is shifted onto the filling tube, with its front end facing towards the gathering means. The front end of said tubular packaging casing, typically, is already closed by a closure clip. Accordingly, the operator has to guide this end of the tubular packaging casing through the casing brake and further through the gathering means for placing at least the closure clip downstream the gathering means. Thus, the operator needs access not only to the casing brake, but also to the gathering means which usually are covered by the housing of the clipping machine, or at least by portions thereof.

The housing portions of the housing of known clipping machines are often cumbersome to handle, e.g. while opening the housing. Accordingly, opening said housing portions is circumstantial, refilling tubular packaging casing on the filling tube is time consuming and not user friendly.

Thus, it is an object of the present invention to provide a clipping machine which overcomes the above mentioned drawbacks and which is provided with a housing that allows easy and secure access to interior portions of the clipping machine.

SUMMARY OF THE INVENTION

According to the present invention, there is provided a clipping machine for producing sausage-shaped products, like sausages, by filling a tubular or bag-shaped packaging casing with filling material and closing said filled tubular or bag-shaped packaging casing. The clipping machine includes a filling tube through which the filling material is fed into said tubular or bag-shaped packaging casing which is stored on said filling tube, a casing brake assembly arranged on the filling tube for limiting the movement of the tubular packaging casing at least while being filled, gathering means for gathering said filled tubular packaging casing and for forming a plait-like portion thereto, and a clipping device for applying at least one closure means, like a closure clip, to the plait-like portion formed on the filled tubular or bag-shaped packaging casing in a closing region. The clipping machine further comprises a housing defining at least a front wall, a rear wall, and two side walls of the clipping machine, for enclosing at least the clipping device and the gathering means.

The housing of the inventive clipping machine includes at least one housing element arranged in the front wall of the housing for covering at least the closing region, wherein the at least one housing element is coupled to the clipping machine by a linking device including a shifting mechanism for reversibly shifting the housing element relative to the clipping machine, in a shifting direction, for granting access to the closing region of the clipping machine. It has to be understood that the housing element arranged in the front wall of the housing forms a part of the front wall and, when being removed therefrom, e.g. by shifting in shifting direction or by demounting the housing element from the housing, an opening is left in the front wall, previously covered by the housing element.

When covering the closing region, the housing element is in a closing position or covering position, and closes the opening in the housing through which access may be granted to the closing region. When being shifted in the shifting direction, the housing element is moved towards an opening position or release position, by releasing the opening in the housing for granting access to the closing region.

By means of said shifting mechanism, the housing element may be shifted away from the closing region. The operator does not need to step back from the clipping machine for opening the clipping machine, e.g. during refilling tubular packaging casing to the filling tube, and may directly grasp into the closing region, whereby refilling tubular packaging casing to the filling tube is facilitated. Also, an operator does not need to walk around the opened housing element.

It is one of the core functions, that, by means of the shifting mechanism, the housing element may reversibly be moved into and out of the covering position and in the plane of the front wall or in a plane at least approximately parallel to the front wall of the clipping machine, for enabling the operator maintaining his/her position in front of the clipping machine, e.g. without stepping back. In accordance therewith, the shifting motion may be executed on different moving paths, like a linear path inclining, declining, or being aligned horizontally or vertically, or on a non-linear path, like a partially circular moving path.

In a preferred embodiment, the housing element is laterally, reversibly shiftable by the linking device between a covering position wherein the housing element covers the closing region, and a release position in which access is granted to the closing region. Thereby, the housing element may easily and with low effort be shifted out of and back into the covering position.

The housing element may be arranged within the plane of the front wall of the housing for forming a flat outer surface. In the case that the housing element is arranged at a corner of the housing, e.g. a corner between the front wall and one of the side walls, and more particular, that the housing element forms a portion of said corner, the housing element being only partially surrounded by the front wall, may laterally be shifted out of the front wall in one plane including the opening position or release position as well as the closing position or covering position of the shiftable housing element.

In an alternative design of the housing, the housing element may be completely surrounded by the front wall. For shifting the housing element out of its covering position, the housing portion has to be slightly lifted off from the front wall, e.g. by a respective lifting mechanism, preferably in a direction vertically to the front wall, into a plane parallel to the front wall. Thereafter, the housing element may be shifted in the plane parallel to the front wall, into its release position.

In case that the housing element is shifted on a linear moving path, depending on the alignment of the shifting mechanism, the housing element may be shifted in different directions. In one possible arrangement, in which the shifting mechanism is aligned generally vertically, the housing element may be shifted approximately vertically upwardly or downwardly relative to the covering position. In the case that the housing element is shifted approximately downwardly into the release position for granting access to the closing region, the shifting mechanism may be designed such that an operator may kick the housing element by food for re-shifting it into the covering position.

According to a further preferred embodiment of the inventive clipping machine, the linking device further includes a pivot-mechanism for reversibly pivoting the housing element relative to the clipping machine, from the release position into an inspection position.

In the release position, access is granted to the closing region, which may be used by an operator during the production process, e.g. for refilling tubular packaging casing on the filling tube. In this position, the housing element may cover other parts of the clipping machine, like a discharge device, being arranged approximately on the horizontal level of the closing region. By means of the additional position of the housing element, namely the inspection position, the operator gains access not only to parts of the clipping machine covered by the housing element in the release position, like the discharge device, but also to the closing region from a lateral direction. This position may be of advantage e.g. during maintenance or repair of the clipping machine, or for replacing the clipping tools or gathering elements, without the need of completely disassemble the clipping machine.

The pivot mechanism includes a pivot axis about which the housing element is pivoted for moving the housing element into or out of the inspection position. The pivot axis of the pivot mechanism may be arranged in any suitable alignment, like a horizontal or vertical alignment. Alternatively, the pivot axis of the pivot mechanism may also be aligned in any suitable angle different from the vertical or horizontal alignment.

In an preferred design, the pivot axis of the pivot mechanism is horizontally aligned and parallel to the front wall, and the pivot mechanism is arranged at the upper end of the housing element. Accordingly, the housing element may be pivoted about said horizontal axis from the release position into the inspection position. Dependent on the position of the pivot axis relative to the housing element, the housing element can be pivoted downwardly, in case that the pivot axis is arranged in the region of its lower end.

In a further preferred design, the pivot axis is arranged in the upper region of the housing element. Accordingly, when pivoted into the inspection position, the housing element is arranged at least approximately vertically above the release position, with its inner surface facing away from the housing of the clipping machine. In this specific position, the housing element is moved out of the working area of an operator during maintenance or repair of the clipping machine.

According to an advantageous embodiment, the shifting mechanism includes a telescopic arrangement including a guide bar and a slide reversibly shiftable along the guide bar. This specific design ensures a high functionality and reliability.

Further advantageously, the pivot mechanism extends from the slide in the shifting direction towards the release position. The housing element, when mounted to the pivot mechanism, is shifted together with the pivot mechanism into the release position. This construction enables to shorten the telescopic arrangement, and to simplify its design.

In the case that the pivot mechanism includes a shaft having a longitudinal axis, and being mounted to the slide, and at least one hinge element pivotally arranged on the shaft, the pivot mechanism is reliable and of a simple design.

In a preferred embodiment, the pivot mechanism includes a securing device for securing the housing element at least in the inspection position, in order to prevent an unintended movement of the housing element out of the inspection position and a possible injury of an operator.

Furthermore, it is preferred that a first sensor device is provided for detecting the housing element at least in the covering position. By means of said first sensor device, the operation of the clipping machine may be allowed only in the case that the housing element is in the covering position. Also, the operation of the clipping machine may be prevented in the case that the housing element is not in the covering position.

For further improving the functionality of the inventive clipping machine, a release mechanism is provided for controlled shifting the housing element at least slightly towards the release position. The housing element may thereby automatically be shifted out of the covering position, at least about a short distance to enable an operator to grasp an edge of the housing element for shifting it into its final position, the release position or the inspection position, respectively. Accordingly, an additional handle at the housing element or the like, for moving the housing element out of the covering position may be omitted, which may obstruct the operator during the production process.

Furthermore, in case of an automatically actuated release mechanism, said mechanism may be controlled such that it may only be activated when the clipping machine is stopped.

As an additional safety feature, in a preferred embodiment of the inventive clipping machine, a second sensor device is provided for detecting the presence or absence of the casing brake assembly in an operating position on the filling tube. The second sensor element may prevent operation of the clipping machine in case that the casing brake assembly is not in its operating position, and may allow operation of the clipping machine in case that the casing brake assembly is properly positioned.

Additionally to the above described function, the second sensor device may also be coupled with the release mechanism, e.g. via the control unit of the clipping machine. In this embodiment, the release mechanism may be controlled by the second sensor device, such that, when removing the casing brake assembly from the clipping machine, the second sensor device not only detects the absence of the casing brake assembly, but also actuates the release mechanism. Additionally, an optical or acoustical signal may be output.

Further advantages and preferred embodiments of the present invention will be described in the following together with the drawings listed below. The expressions "left", "right", "below" and "above" used in the following description, are referred to the drawings in an alignment such that the reference numbers and the notation of the Figs. used can be read in normal orientation.

BRIEF DESCRIPTION OF THE DRAWINGS

FIG. 7: is a schematic and perspective view to the clipping machine of FIG. 2, with the housing element in the inspection position.

DETAILED DESCRIPTION

Figure 1:
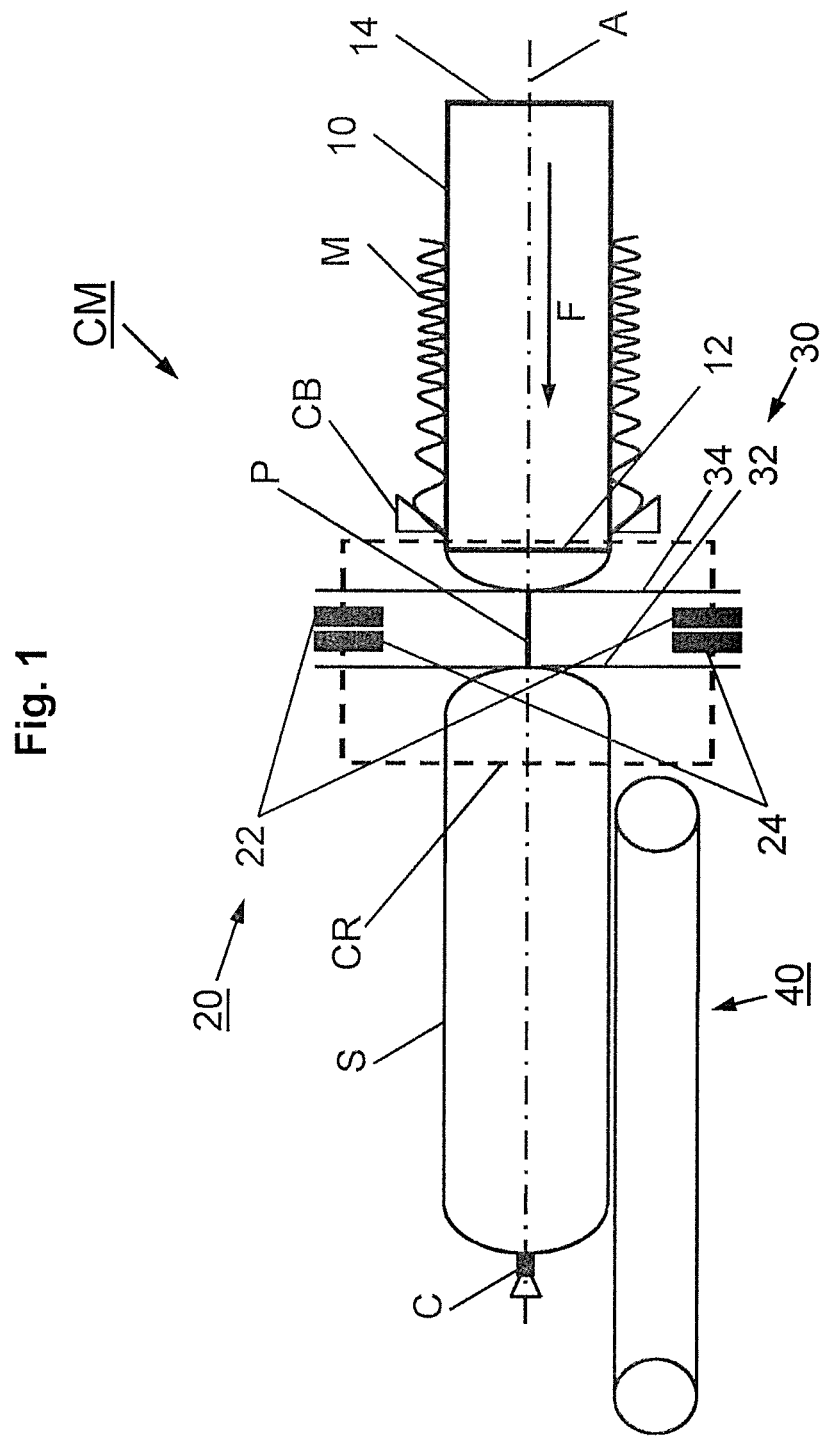
FIG. 1: is a schematic view to a clipping machine according to the present invention.

A clipping machine CM for producing sausage-shaped products S shown in FIG. 1, comprises, as main components, a cylindrical filling tube 10 having a longitudinally extending central axis A and being made of a suitable material, like stainless steel. A tubular packaging casing M made of a thin sheet material is stored on the filling tube 10. Clipping machine CM further includes a clipping device 20 and gathering means 30 for gathering the filled tubular packaging casing M and for forming a plait-like portion P thereto which are arranged downstream filling tube 10. The plait-like portion P is at least approximately free of filling material. Clipping device 20 is provided for closing the filled tubular packaging casing M by applying a closure means, like a closure clip C, to said plait-like portion P. It has to be understood that clipping machine CM includes a control unit for controlling operation of the components of clipping machine CM.

As further can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F into tubular packaging casing M closed on its end facing in the filling direction F by a closure clip C.

A casing brake assembly CB is arranged on filling tube 10 in the vicinity of left end 12 of the filling tube 10 in order to control the movement or pull-off speed of tubular packaging casing M when pulled-off from filling tube 10 resulting from the filling pressure of the filling material, by applying a frictional force to tubular packaging casing M. In FIG. 1, for clarity reasons, only one ring-shaped brake element of casing brake assembly CB is shown.

Positioned immediately downstream left end 12 of filling tube 10, clipping device 20 is arranged and coaxially aligned to filling tube 10. Clipping device 20 comprises a first and a second pair of clipping tools 22, 24, wherein each pair of clipping tools 22, 24 includes a punch and a die. Gathering means 30 include a first displacer unit 32 and a second displacer unit 34 each including a pair of displacer elements, wherein first displacer unit 32 is positioned downstream second displacer unit 34. First and second pair of clipping tools 22, 24 of clipping device 20 are positioned between first and second displacer units 32, 34 for applying one or two closure clips C to plait-like portion P.

Furthermore, for discharging sausage-shaped product S just produced in clipping machine CM, downstream clipping device 20, a transportation device or belt conveyor 40 is arranged, comprising a conveyor belt and guide rollers. The transportation direction of belt conveyor 40 coincides with feeding direction F. The height of the upper conveyor belt section of belt conveyor 40 is aligned to the lower side of the sausage shaped product S to be produced and discharged from clipping machine CM.

A closing region CR extends between left end 12 of filling tube 10 and the upstream end of belt conveyor 40 facing towards filling tube 10. Closing region CR defines the area of clipping machine CM, through which filled tubular packaging casing M is moved and in which filled tubular packaging casing M is gathered by gathering means 30 for forming plait-like portion P, and at least one closure clip C is applied to plait-like portion P by clipping device 20. Clipping device 20 and gathering means 30 are arranged such that at least clipping tools 22, 24 of clipping device 20 and first and second displacer units 32, 34 of gathering means 30 extend into closing region CR.

Figure 2:
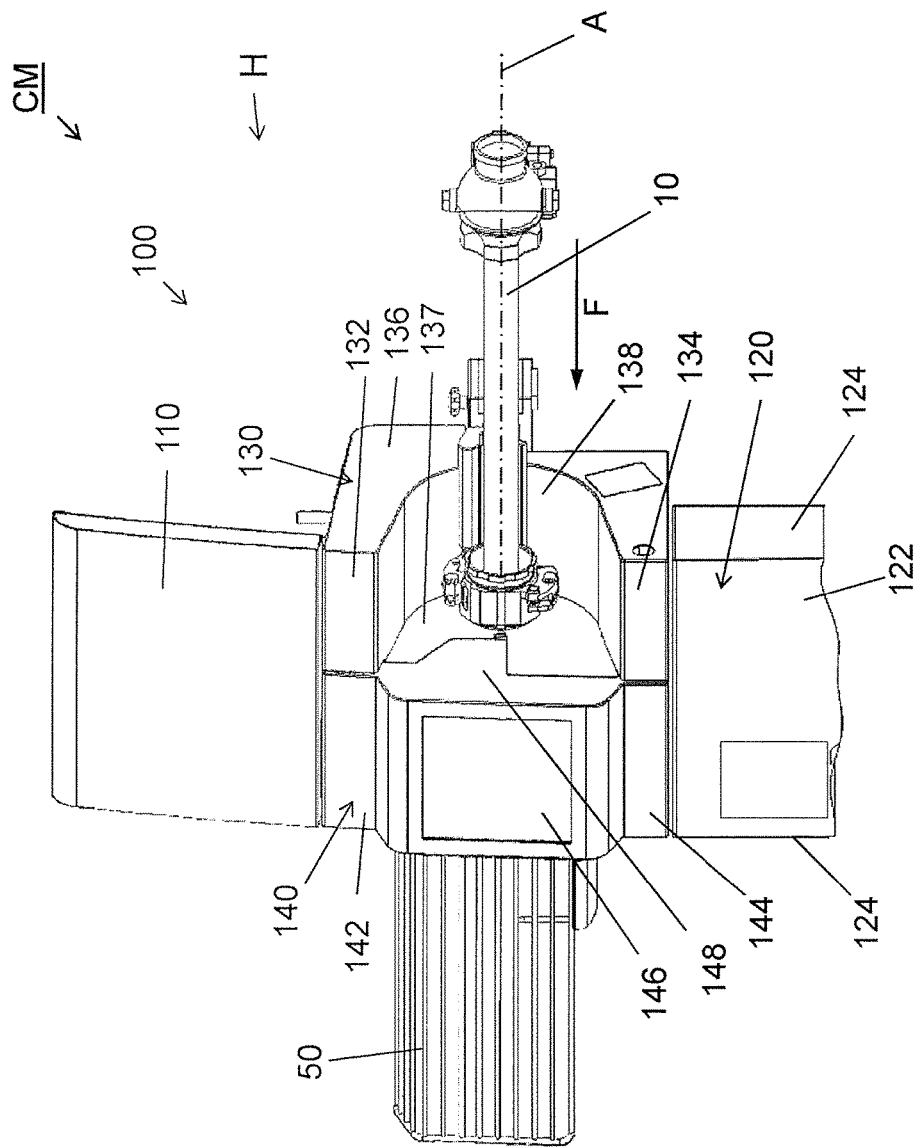
FIG. 2: is a cut-out of a schematic and perspective view to an inventive clipping machine according to the present invention with the housing element in the covering position.

FIG. 2 shows clipping machine CM with a housing element 140 in a covering position, in which housing element 140 covers closing region CR of clipping machine CM.

The cut-out according to FIG. 2 further shows a protective grid 50 for covering transportation device or belt conveyor 40, and parts of a housing H of clipping machine CM, namely front wall 100 with an upper front wall portion 110, a lower front wall portion 120, a central housing portion 130, and housing element 140. Moreover, in FIG. 2, filling tube 10 with casing brake assembly CB is shown.

It has to be noted that protective grid 50 not only covers belt conveyor 40, but also a discharge opening in the left side wall of housing H, through which the sausage-shaped products are discharged out of clipping machine CM, for preventing an operator from being injured by reaching into the discharge opening or conveyor belt 40, respectively.

It has to be understood that housing H in general, and in particular its housing portions are made of metal sheet material, like stainless steel. However, it is also possible that portions of the housing are made other suitable materials, like plastic.

Upper front wall portion 110 mainly consists of a flat front with bent edges for stabilizing front wall portion.

Figure 3:
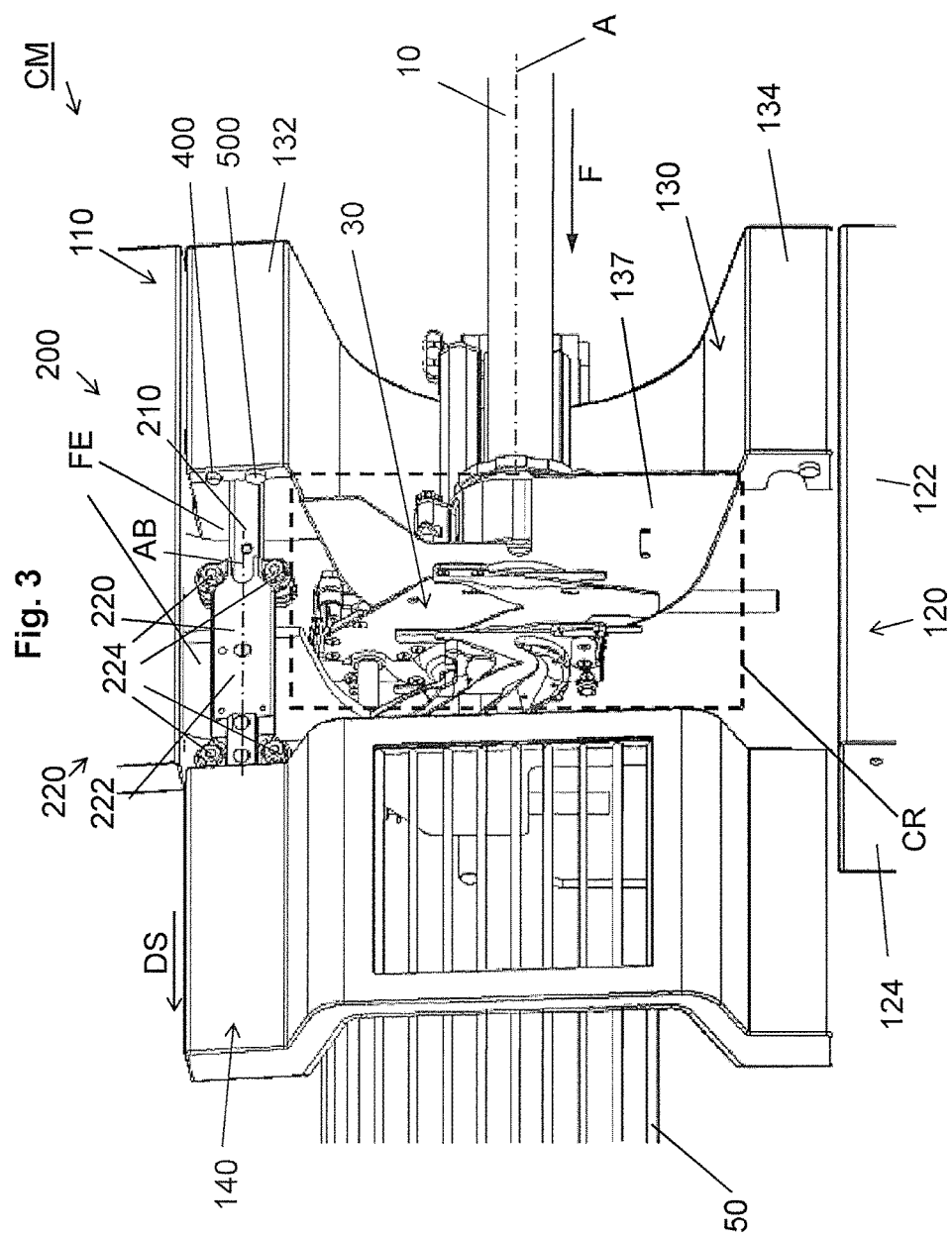
FIG. 3: is a detailed, schematic and perspective view to the clipping machine of FIG. 2, with the housing element in the release position.

Lower front wall portion 120 has one front wall element 122 and two side wall elements 124 forming portions of the left side wall and the right side wall of clipping machine CM (see FIGS. 2 and 3).

Central housing portion 130 extends between the right side wall of housing H of clipping machine CM and closing region CR. The height of central housing portion 130 corresponds at least approximately with the height of closing region CR.

Central housing portion 130 has an upper front wall section 132 and a lower front wall section 134, a right side wall section 136 forming a portion of the right side wall of clipping machine CM, and an approximately semicircular depression 138 which surrounds left end 12 of filling tube 10 with casing brake assembly CB positioned on filling tube 10. Central housing portion 130 further includes a separation portion 137 arranged on the left side of central housing portion 130 and in a plane parallel to right side wall section 136. Separation portion 137 extends at least partially within semicircular depression 138 such that it separates left end 12 of filling tube 10 with casing brake assembly CB from closing region CR with clipping device 20 and gathering means 30 arranged therein.

Housing element 140 of housing H has an approximately rectangular outer shape, and extends between the left side wall housing H of clipping machine CM and central housing portion 130. The height of housing element 140 corresponds to the height of central housing portion 130. Housing element 140 which in FIG. 2 is in its covering position, completely covers losing region CR of clipping machine CM.

Housing element 140 has an upper front wall section 142 and a lower front wall section 144, a middle section 146 and a side section 148 extending on the right side of housing element 140 towards clipping machine CM and parallel to separation portion 137 of central housing portion 130. Middle section 146 is arranged in a plane parallel to upper and lower front wall sections 142, 144, and with an offset thereto.

Middle section 146 is of approximately rectangular shape, extends over the whole width of housing element 140, and includes a rectangular window enabling a visual inspection of closing region CR, when housing element 140 is in the covering position. The window may consist of a suitable plastic or glass.

As further can be seen in FIG. 2, upper front wall portion 110, front wall element 122 of lower front wall portion 120, upper and lower front wall sections 132, 134 of central housing portion 130 and upper and lower front wall sections 142, 144 of housing element 140 extend in a common plane, and together with middle section 146 and semicircular depression 138, these elements form front wall 100 of housing H of clipping machine CM.

The common plane of upper front wall portion 110, front wall element 122 of lower front wall portion 120, upper and lower front wall sections 132, 134 of central housing portion 130 and upper and lower front wall sections 142, 144 of housing element 140 has to be understood as not being limited to a flat plane. These element may also form a plane being curved in at least one direction, e.g. in the vertical direction.

In the covering position as shown in FIG. 2, side section 148 of housing element 140 and separation portion 137 of central housing portion 130 complete one another to a common wall element which covers the right side of closing region CR.

For reversibly moving housing element 140 from the covering position into the release position as shown in FIG. 3, housing element 140 is horizontally shifted in a shifting direction DS which corresponds to feeding direction F, in the plane of front wall 100. In the release position, housing element 140 is arranged laterally to housing H of clipping machine CM, with its right edge aligned to the left edge of front wall 100.

Housing element 140 is coupled to clipping machine CM by a shifting mechanism 200 which is part of a linking device, which includes a guide bar 210 and a slide 220.

Horizontally arranged guide bar 210 is coupled to frame elements FE of clipping machine CM by mounting brackets 250. Guide bar 210 extend approximately over the whole width of clipping machine CM, between its left side wall and its right side wall inside clipping machine CM, and immediately behind upper front wall sections 132, 142 of central housing portion 130 and housing element 140 (see also FIGS. 4 to 6).

Slide 220 includes an approximately cuboid body 222 which has a longitudinally extending central axis AB, and which is arranged parallel to and in front of guide bar 210. Four rollers 224 are arranged on the rear side of body 222 of slide 220, and in the region of its corners such that two rollers 224, the upper rollers 224, with their running surfaces are in contact with an upwardly facing surface 212 of guide bar 210. The respective other two rollers 224 are arranged opposite to upper rollers 224 such that their running surfaces are in contact with a downwardly facing surface 214 of guide bar 210. Upwardly and downwardly facing surfaces 212, 214 of guide bar 210 are provided with a longitudinally extending guide element, whereas the running surfaces of rollers 224 comprise a respective counter guide element, like protrusions extending along guide bar 210 which engage respective circumferential recess in the rollers 224 (see also FIGS. 5 to 6). Guide bar 210 and slide 220 of shifting mechanism 200 form a telescopic device which enables a reversible horizontal shifting of housing element 140 from the covering position into the release position.

Figure 4:
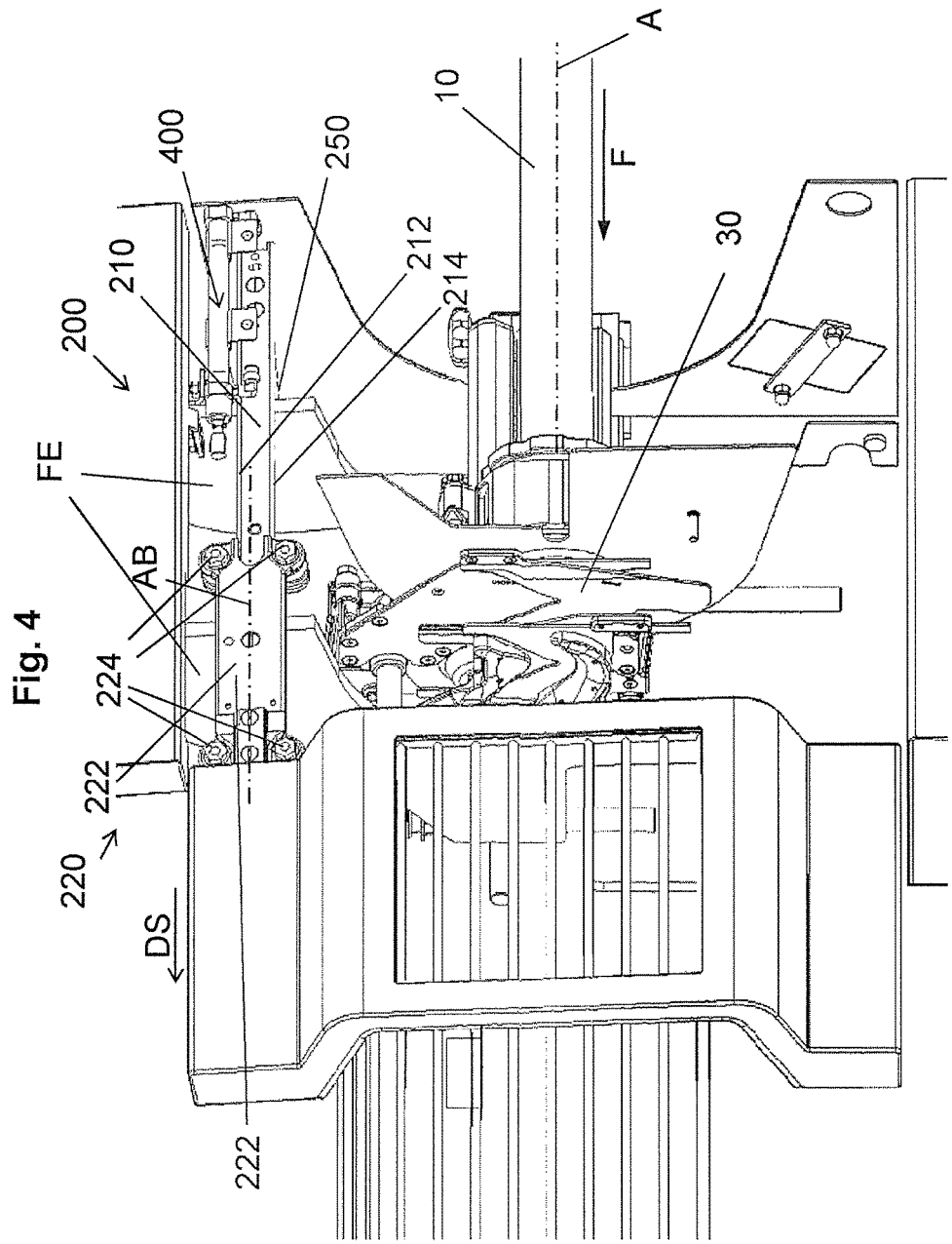
FIG. 4: is the same detailed, schematic and perspective view to the clipping machine of FIG. 2, with the housing element in the release position, wherein front wall sections have been omitted for showing the shifting mechanism according to the present invention.

As can be seen in FIG. 4, housing element 140, when in the release position, at least partially covers protective grid 50. Housing element 140 with middle section 146 projecting out of the plane of upper and lower front wall sections 142, 144 has a shape mating the shape of protective grid 50.

A pivot mechanism 300, which is also part of the linking device, is coupled to left end of slide 220 of shifting device 200 i.e. that end facing in shifting direction DS.

Figure 5:
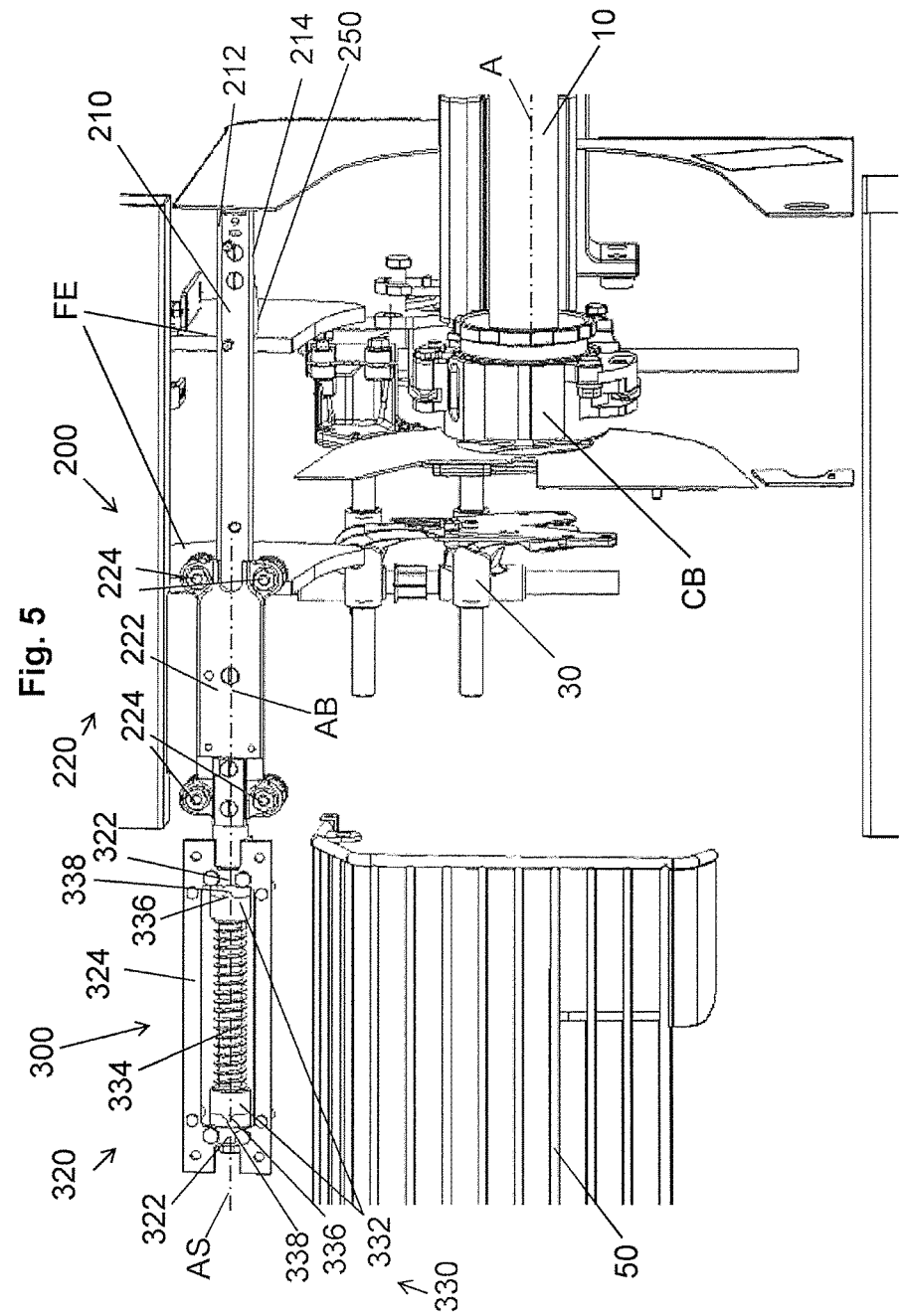
FIG. 5: is the detailed, schematic and perspective view to the clipping machine of FIG. 4, wherein the housing element has been omitted for showing the pivot mechanism according to the present invention.

Pivot mechanism 300, as can be seen in FIG. 5, includes a shaft 310 having a left end 312 and a right end 314, a longitudinal axis AS and being at least approximately coaxially aligned with central axis AB of body 222 of slide 220. Shaft 310 is fixedly connected with its right end 312 to the left end of body 222 of slide 220.

Figure 6:
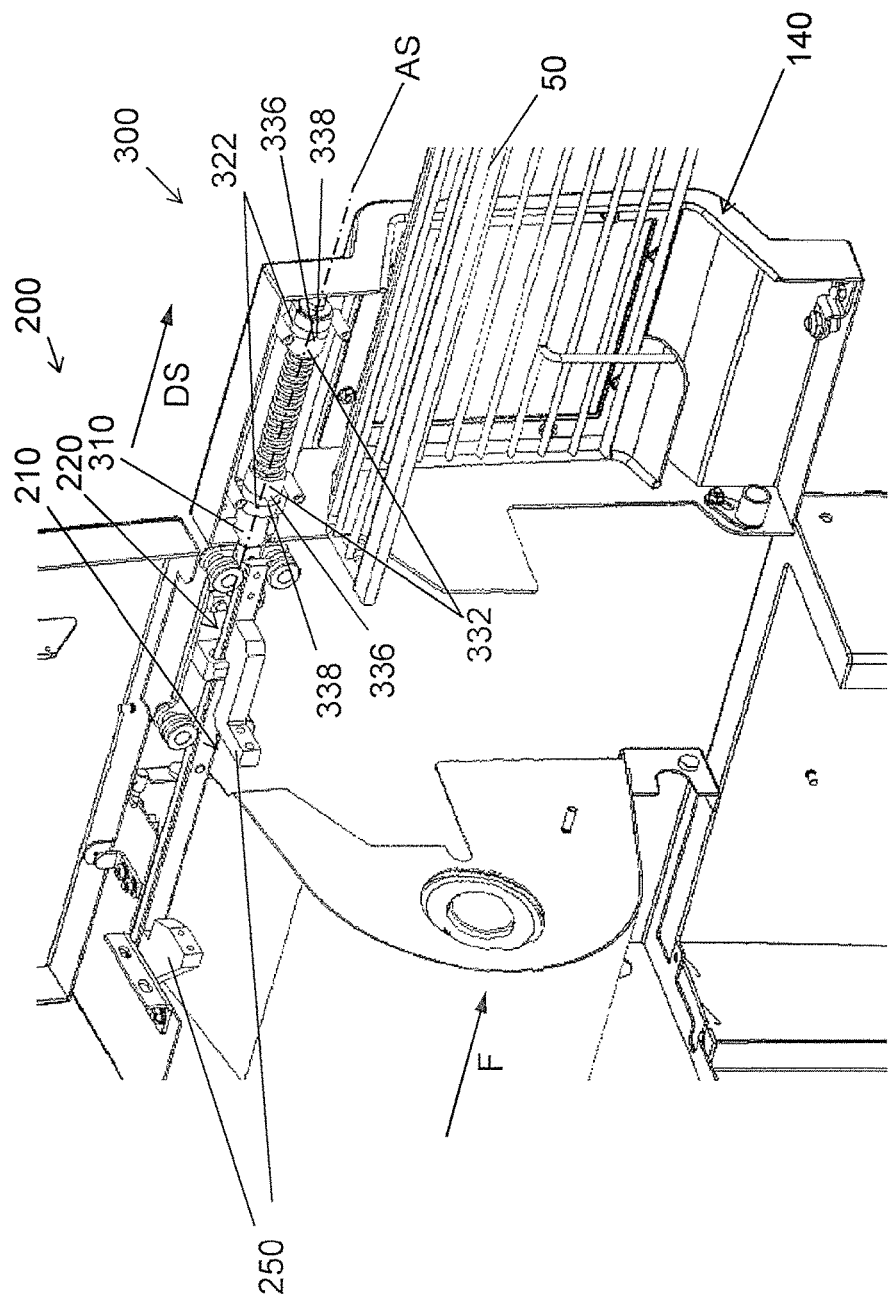
FIG. 6: is the detailed, schematic and perspective view to the inside or rear side of the front wall of the clipping machine of FIG. 2, with the housing element in the release position.

As can be inferred from FIGS. 5 and 6, mounting means 320 are arranged on shaft 310 for rotatably mounting housing element 140 thereto. Mounting means 320 include two mounting sockets 322 arranged in the region of the left and right ends 312, 314 of shaft 310. A frame 324 connects mounting sockets 322 with the rear side of upper front wall sections 142 of housing element 140. Thereby, housing element 140 may reversibly be pivoted together with mounting sockets 322 about longitudinal axis AS of shaft 310 from the release position into an inspection position as shown in FIG. 7. In the inspection position, housing element is positioned laterally to upper front wall portion 110 and in the plane of front wall 100 of housing H.

Pivot mechanism 300 further includes a securing device 330 which includes two bushings 332 arranged between mounting sockets 322 on shaft 310, and with a coil spring 334 there between. Bushings 332 are torque proof, but axially shiftable secured to shaft 310. Coil spring 334 urges bushings 332 against mounting sockets 322. The annular surfaces of bushings 332 and mounting sockets 322 are provided with an engagement element 336 and a respective counter engagement element 338, like mating thongs and grooves, which are positioned such that the engagement elements and the mating counter engagement engage each other when housing element is in the release position and in the inspection position, respectively (see FIGS. 5, 6). Securing device 330 thereby secures housing element 140 against unintentional movement out of or into the release position and the inspection position, respectively.

Clipping machine CM, as can be seen in FIGS. 3 and 4, includes a release mechanism 400 for pushing housing element 140 out of the covering position towards the release position.

Release mechanism 400 includes a horizontally arranged piston/cylinder arrangement 410 with a cylinder 412 mounted to the rear side of upper front wall section 132 of central housing portion 130. A piston 414 arranged in cylinder 412 may reversibly be moved in shifting direction DS. At its free end, piston 414 has an abutment element 416, like a rubber cap, which abuts housing element 140 while pushing it in shifting direction DS.

The length of piston/cylinder arrangement 410, and in particular, the length about which piston 414 can be moved in shifting direction, may be selected such that housing element 140 can be pushed only a short distance towards the release position, to enable an operator to grasp into the gap formed between housing element 140 and upper front wall section 132, for completely shifting housing element 140 into the release position. It is also possible that housing element 140 is completely shifted into the release position by release mechanism, whereby manually moving housing element 140 into the release position is not necessary.

As further can be seen in FIGS. 3 and 7, a first sensor device 500 is provided, by means of which the presence or absence of housing element 140 in the covering position may be detected. First sensor device 500 is arranged on the rear side of upper front wall section 132 of central housing portion 130 and below release mechanism 400.

First sensor device 500 includes a sensor element 510 which extends from upper front wall section 132 and faces towards housing element 140. Sensor element 510 may be a single sensor element, like a light sensitive element, which is covered by housing element 140 when in the covering position. Alternatively, sensor element 510 may include a first sensor portion attached to central housing portion 130 and a second sensor portion, which cooperates with the first sensor portion, and which is attached at a respective position on housing element 140.

First sensor device 500 is coupled to the control unit of clipping machine CM, and may be used for controlling clipping machine CM such that an operation of clipping machine CM is prevented when housing element 140 is not in the covering position. Alternatively or additionally, for maintenance or repair, only specific operations of clipping machine CM may be allowed in this situation. On the other hand, with housing element 140 in the covering position, clipping machine CM may be operated without any restrictions.

Additionally to first sensor device 500, a second sensor device (not shown) may be provided on clipping machine CM and coupled to its control unit. Said second sensor device includes a sensor element which may detect the presence or absence of casing brake assembly CB in its operating position, i.e. when positioned on filling tube 10 as shown in FIGS. 2 to 7. In case that casing brake assembly CB is in its operating position, operation of clipping machine CM may be allowed. Otherwise, when casing brake assembly CB is not present in its operating position, operation of clipping machine CM may be prevented.

Release mechanism 400 may be activated manually by an operator which pushes a respective switch, e.g. in the case that tubular packaging casing has to be refilled on filling tube 10.

Alternatively or additionally, release mechanism 400 may also be activated automatically, e.g. dependent on a signal of the second sensor device. In case that casing brake assembly CB is removed from clipping machine CM, the second sensor device outputs a respective signal to the control unit of clipping machine CM, indicating that casing brake assembly CB is not in its operating position. Via the control unit, release mechanism 400 may be activated moving housing element 140 towards its release position, for enabling e.g. refilling tubular packaging casing M on filling tube 10 and for positioning the front end of the new tubular casing material in closing region CR.

In a further alternative embodiment, a casing sensor may be provided in the region of filling tube 10, which may detect the presence or absence of tubular packaging casing M on filling tube 10, or damages of tubular packaging casing M, like leakages or fissures. The casing sensor may than output a respective signal on the basis of which clipping machine CM is stopped and housing element 140 is moved out of the covering position and shifted towards the release position by release mechanism 400.

Further alternatively, by means of the signal of the casing sensor, only housing element 140 may be shifted out of the covering position by release mechanism 400. First sensor device 500 detects the absence of housing element 140 in the covering position, and will cause clipping machine CM to be stopped, as explained above.

In operation, filling material is fed through filling tube 10 into tubular casing material M stored on filling tube 10 and closed at its front end by a closure clip C. After a predetermined amount of filling material has been filled into tubular packaging casing M, gathering means 30 gather the filled tubular packaging casing M and forming a plait-like portion P thereto. Clipping device 20 places and closes one or two closure clips C on plate-like portion P, for closing the rearward end of the just filled tubular packaging casing M and for closing the front end of the remaining tubular packaging casing M. The sausage-shaped product S just produced is severed and discharged from clipping machine CM by belt conveyor 40.

During the production of sausage-shaped products S, housing element 140 is in the covering position for preventing unintentional engagement of closing region CR by an operator.

For refilling tubular packaging casing M of filling tube 10, filling tube 10 together with casing brake assembly CB is pivoted out of its operating position, and casing brake assembly CB is removed from filling tube 10. New tubular packaging casing M is placed on filling tube 10, casing brake assembly CB is shifted onto filling tube 10 and pivoted back into its operating position.

In the case that a second sensor device in provided, it detects the absence of casing brake assembly CB after being pivoted out of its operating position. Accordingly, a signal is sent to the control unit of clipping machine CM. The control unit not only disables operation of clipping machine CM, but also activates release mechanism 400, which pushes housing element 140 out of the covering position towards the release position.

With housing element 140 pushed out of the covering position first sensor device 500 detects the absence of housing element 140 in the covering position, and sends a respective signal to the control unit of clipping machine CM, which prevents operation of clipping machine CM.

The operator may now refill tubular packaging casing M onto filling tube 10, place casing brake assembly CB on filling tube 10 and pivot filling tube 10 together with casing brake assembly CB back into their operating position. The second sensor device detects casing brake assembly CM in its operating position and sends a respective signal to the control unit of clipping machine CM.

Due to the absence of housing element 140 in the covering position, which has been detected by first sensor device 500, the operation of clipping machine CM remains disabled although casing brake assembly CM is placed in its operating position and is detected by the second sensor device.

After filling tube 10 together with casing brake assembly CB is pivoted back into their operating position, the operator may place the front end of tubular packaging casing M in closing region CR, for placing a first closure clip C thereto, closing the front end of tubular packaging casing M.

Thereafter, the operator shifts housing element 140 from the release position back into the covering position. First sensor device 500 detects the presence of housing element 140 in the covering position and sends a respective signal to the control unit of clipping machine CM, and clipping machine CM may be restarted.

It has to be understood that first sensor device 500 and the second sensor device, additionally to the signal sent to the control unit, may also output a signal to the operator, like an audible and/or visible signal, informing the operator that casing brake assembly CB is not in its operating position, and that housing element 140 is not in the covering position.

First and second sensor devices may be of any suitable kind, like including a single piece or two-piece sensor element, and may include any suitable kinds of sensor elements, like optical elements detecting or emitting light, or sensor elements detecting a respective material, like metal, or electric or magnetic fields.

Covering element 140 has been described as forming a portion of the left front corner of housing H of clipping machine CM. Thus, housing element 140 may be shifted from the covering position towards the release position in the plane of front wall 100 of housing H. In the case that housing element 140 does not form a portion of a corner of housing H, e.g. when completely surrounded by other housing portions, a lifting mechanism may be provided for lifting housing element 140 out of the plane of front wall 100 into a plane parallel thereto, to enable housing element 140 to be shifted into the release position laterally to housing H of clipping machine CM. In this case, housing element 140 may also be shifted into a release position which is arranged vertically above the covering position.

It has to be noted that further sensor devices may be provided for detecting the housing element in the release position and in the inspection position, which e.g. may be attached to the linking device. Depending on the detected position of housing element 140, specific functions of clipping machine CM may be enabled or disabled, in order to allow maintenance and repair of clipping machine CM, or in order to allow test runs of clipping machine CM or selected components thereof, or to execute selected functions with a selected, e.g. reduced speed, like shifting specific machine elements.

What is claimed is:

1. A clipping machine for producing sausage-shaped products by filling a tubular or bag-shaped packaging casing with filling material and closing said filled tubular or bag-shaped packaging casing, including a filling tube through which the filling material is fed into said tubular or bag-shaped packaging casing which is stored on said filling tube, a casing brake assembly arranged on the filling tube for limiting the movement of the tubular packaging casing at least while being filled, gathering means for gathering said filled tubular packaging casing and for forming a plait-like portion thereto, and a clipping device for applying at least one closure means to the plait-like portion formed on the filled tubular or bag-shaped packaging casing in a closing region, the clipping machine further comprises:

a housing defining at least a front wall, a rear wall, and two side walls of the clipping machine, for enclosing at least the clipping device and the gathering means, wherein the housing includes at least one housing element arranged in the front wall of the housing for covering at least the closing region, wherein the at least one housing element is coupled to the clipping machine by a linking device including a shifting mechanism for reversibly shifting the housing element relative to the clipping machine, in a shifting direction, for granting access to the closing region of the clipping machine.

2. The clipping machine according to claim 1, wherein the housing element is laterally, and reversibly shiftable by the linking device between a covering position wherein the housing element covers the closing region, and a release position in which access is granted to the closing region.

3. The clipping machine according to claim 2, wherein the linking device further includes a pivot-mechanism for reversibly pivoting the housing element relative to the clipping machine, from the release position into an inspection position.

4. The clipping machine according to claim 3, wherein, in the inspection position, the housing element is arranged at least approximately vertically above the release position.

5. The clipping machine according to claim 3, wherein the pivot mechanism extends from a slide in the shifting direction.

6. The clipping machine according to claim 5,
wherein the pivot mechanism includes a shaft having a longitudinal axis, and being mounted to the slide, as well as at least one hinge element pivotably arranged on the shaft.

7. The clipping machine according to claim 6,
wherein the pivot mechanism includes a securing device for securing the housing element at least in the inspection position.

8. The clipping machine according to claim 3,
wherein the pivot mechanism includes a securing device for securing the housing element at least in the inspection position.

9. The clipping machine according to claim 1,
wherein the shifting mechanism includes a telescopic arrangement including a guide bar and a slide which is reversibly shiftable along the guide bar.

10. The clipping machine according to claim 1,
wherein a first sensor device is provided for detecting the housing element at least in a covering position wherein the housing covers the closing region.

11. The clipping machine according to claim 1,
wherein a release mechanism is provided for controlled shifting the housing element at least slightly towards a release position in which access is granted to the closing region.

12. The clipping machine according to claim 1,
wherein a second sensor device is provided for detecting the presence or absence of the casing brake assembly in an operating position on the filling tube.

13. The clipping machine according to claim 12,
wherein a release mechanism is controlled by the second sensor device.

14. The clipping machine according to claim 1,
wherein the housing element includes a window.

15. The clipping machine according to claim 1,
wherein an upper front wall portion, a front wall element of a lower front wall portion, upper and lower front wall sections of a central housing portion and upper and lower front wall sections of housing element extend in a common plane for forming the front wall of housing.

16. The clipping machine according to claim 1,
wherein a lifting mechanism is provided for lifting the housing element out of a plane of the front wall and in a direction vertically thereto.

\* \* \* \* \*